Nov. 29, 1966   L. O. MYERS   3,288,496
SWIVEL TUBULAR COUPLING HAVING A CAST INTERLOCK
Filed April 27, 1964   2 Sheets-Sheet 1
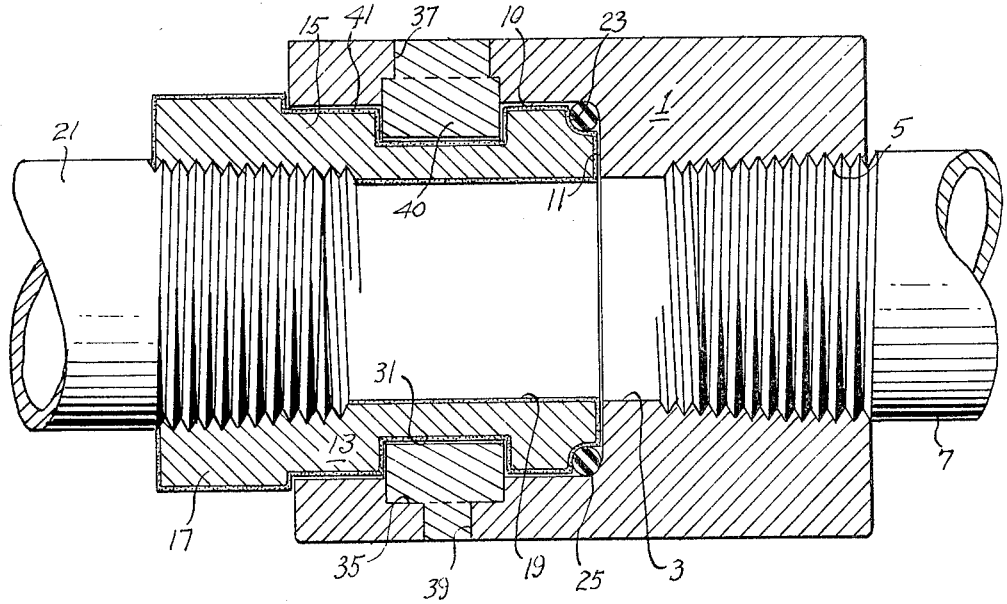
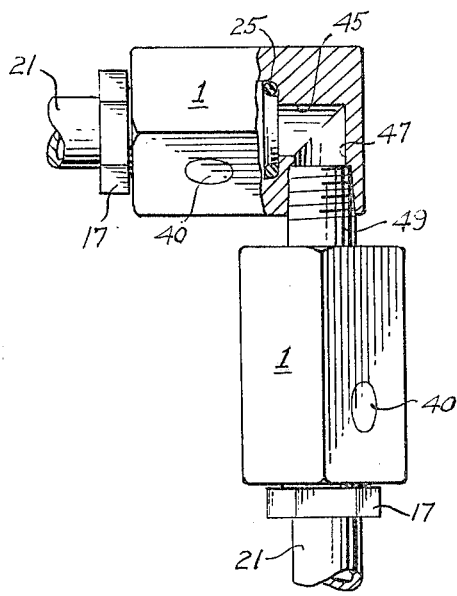
INVENTOR.
LEON O. MYERS
BY
*Bruce & Brosler*
HIS ATTORNEYS

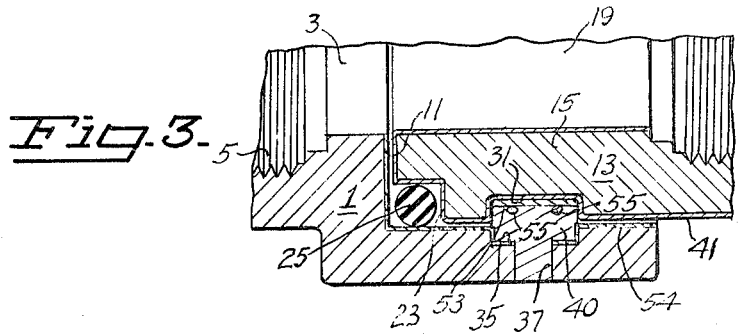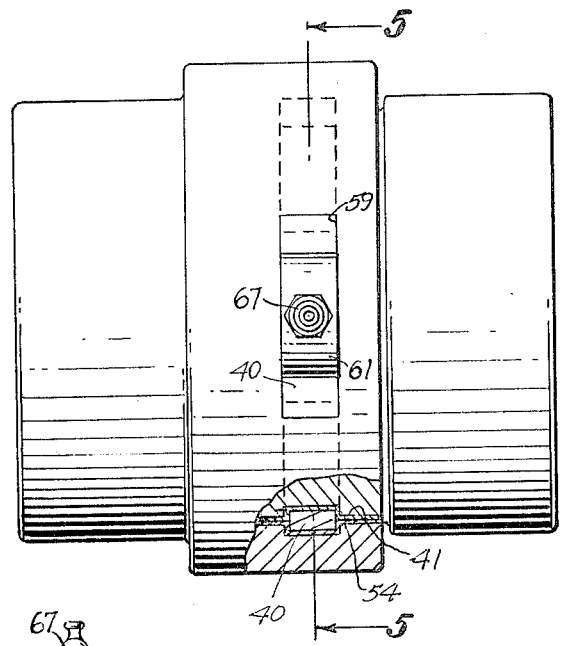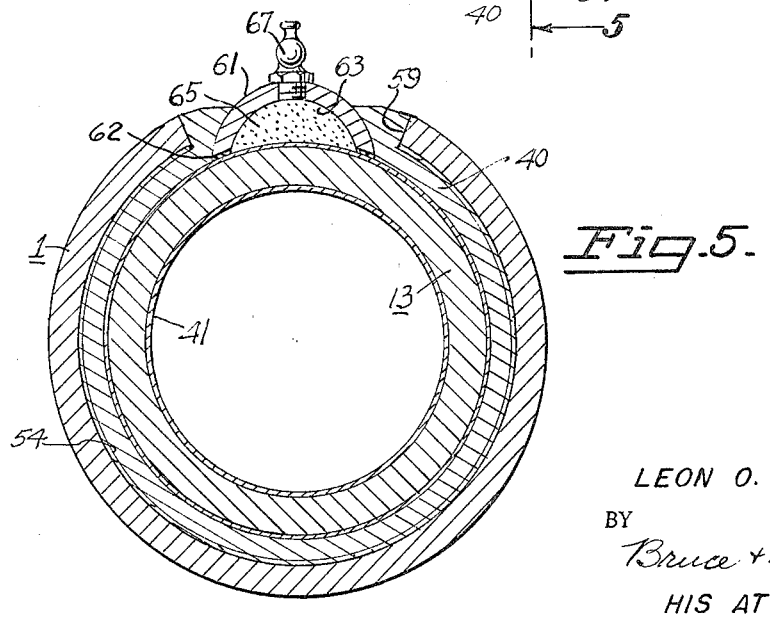

United States Patent Office 3,288,496
Patented Nov. 29, 1966

3,288,496
SWIVEL TUBULAR COUPLING HAVING A
CAST INTERLOCK
Leon O. Myers, Oakland, Calif., assignor of one-half to
Bruce & Brosler, a partnership composed of Charles
O. Bruce and Edward Brosler
Filed Apr. 27, 1964, Ser. No. 363,681
3 Claims. (Cl. 285—94)

This application is a continuation-in-part of my application for Swivel Coupling and Method of Assembling Same, Serial No. 134,202, filed August 28, 1961 and now abandoned.

My invention relates to pipe couplings and more particularly to a swivel coupling.

Among the objects of my invention are:

(1) To provide a novel and improved swivel coupling;

(2) To provide a novel and improved swivel coupling which avoids needs for a ball or roller bearings;

(3) To provide a novel and improved swivel coupling which may be produced economically;

(4) To provide a novel and improved swivel coupling which utilizes but one sealing ring;

(5) To provide a novel and improved swivel coupling of simple construction but highly resistant to leakage;

(6) To provide a novel and improved swivel coupling possessing low friction to rotation, yet which is well sealed against liquid leakage;

(7) To provide a novel and improved swivel coupling which can withstand substantial moment stresses; and (8) To provide a novel and improved method of assembling a swivel coupling.

Additional objects of my invention will be brought out in the following description of a preferred embodiment of the same, taken in conjunction with the accompanying drawings wherein:

FIGURE 1 is a view in section along the longitudinal axis of one embodiment of my invention;

FIGURE 2 is a view partly in section, depicting a slightly modified form of swivel coupling coupled to one of FIGURE 1 to provide a 90° swivel connection.

FIGURE 3 is a fragmentary view depicting an improvement in the embodiment of FIGURE 1;

FIGURE 4 is a view, partly in section, of a modification of the invention as illustrated in FIGURES 1 and 3;

FIGURE 5 is a view in section in the plane 5—5 of FIGURE 4.

Referring to the drawings for details of my invention in its preferred form, the same comprises an outer component 1 having a longitudinal cylindrical passageway 3 therethrough, which is threaded at one end 5 for connection of a pipe 7 or equivalent.

At its other end, the outer component is recessed or counterbored to form an internal cylindrical wall 10 and an internal shoulder 11.

For assembling with the outer component, is a complementary inner component 13 including a smooth fitting cylindrical portion 15 having an exposed head 17 at one end, and provided with an axial passageway 19 of a diameter corresponding to that passageway 3 of the outer component, with the head end of the passageway threaded for connection of a pipe 21 or equivalent.

The inner end of the complementary component is formed with a circumferential corner groove 23 to receive an O-ring 25, in any conventional manner to effect sealing at this point in the swivel.

The outer and inner components of the swivel coupling are assembled with the O-ring installed between the shoulder 11 and the proximate end of the inner component, and to reduce probable friction in this region, I contemplate coating the O-ring with the friction reducing material such as powdered molybdenum, sometimes referred to as moly-disulphide.

Where the swivel coupling is likely to be employed in systems handling petroleum products or the like, an O-ring of material resistant to such chemicals should be employed. In this category, an O-ring of synthetic rubber such as butadiene will function very adequately.

To maintain the proper relationship between the aforementioned components when assembled, the inner component 13 of the swivel coupling is rotatably interlocked with the outer member 1, by interlocking means between the opposing walls thereof, thereby protecting the same from liquid or gases flowing through the swivel, by the O-ring or other sealing ring employed in lieu of the O-ring.

To accomplish this, I preferably provide a circumferential groove 31 in the outer cylindrical wall of the inner component, and an opposing groove 35 in the inner wall 10 of the outer component, with a filling opening 37 through the side wall of the outer component and connecting with the counterbore groove 35, and a diametrically located escape opening 39 leading from said groove through the side wall to the atmosphere. The opposing grooves and intervening space are then filled with a filler material 40, preferably a casting alloy having a low melting temperature, for example, and which is adapted to solidify from a liquid state.

When low melting temperature casting alloy is employed, the inner component is provided with a surface coating 41 of a character which will withstand the temperature of the molten alloy and yet not fuse or combine with such alloy. Fluorocarbon resin plastics known as "Teflon" which form a smooth coating when sprayed on metal which has been previously heated to approximately 700° Fahrenheit, is admirably suited for such purpose. Such material is not only chemically inert but fills the pores of the metal and lays down a smooth surface, and, of considerable importance, it has a low coefficient of friction. Casting alloys having melting temperatures under 550° Fahrenheit will satisfy the requirements of the present invention, where "Teflon" is employed, and many such alloys are available. An alloy of 50% tin and 50% lead is one example.

With the inner component coated with "Teflon," it is assembled into the outer component and the molten alloy is poured through the filler opening 37 to completely fill the opposing grooves and any intervening space and permit it to solidify. This manner of interlocking the two components permits of a very close fit between the two, without impeding the rotational movement one with respect to the other, and such close fit serves to stabilize alignment of the swivel components, while the "Teflon" coating serves to minimize wear, and both together insure long and efficient functioning of the swivel connection. In this connection, physical contact between the alloy and the plastic coating has not been depicted, but only for purposes of clearly delineating the coating and indicating permissible relative movement between the two.

Additional advantages may be effected by adding to the "Teflon" coating, a film of moly-disulphide and silicone grease.

In FIGURE 2 of the drawings, I have illustrated a swivel assembly similar to that of FIGURE 1, coupled to a slightly modified form of assembly embodying the present invention, to realize a 90° swivel coupling.

The modified assembly is similar in all respects to that of FIGURE 1 except in that the passageway 45 through the outside component, instead of continuing through such component along the longitudinal axis thereof, exits from the component through the side wall thereof, to provide a lateral passageway section 47 which is internally threaded. To this end is connected a nipple 49 for connection of the other swivel coupling.

In the embodiment of FIGURE 3, a thin layer 53 of asbestos or equivalent material is applied to the bottom of the circumferential groove 31, prior to pouring of the alloy. Such layer permits of the utilization of higher melting point alloys, such as Kirksite "A" which is solid at 717° F., liquid at 745° F., has a tensile strength of 37,860 lbs. per sq. inch, a compressive strength of 77,800 lbs. per sq. inch, a shear strength of 34,000 lbs. per sq. inch, and a Brinnell hardness of 100, besides having a self-lubricating quality, and will not seize under any condition. It is corrosion resistant to all normal liquids, acids and gases, and will withstand heavy thrust loads at temperatures to 350° F.

The inner surface of the outer component 1, may, like the outer surface of the inner component 13, be likewise provided with a layer 54 of Teflon or its equivalent.

The inner surface of the asbestos may be coated with graphite, to which may be added lead plate lube which is a high temperature resistant lubricating grease, and when so coated, the swivel assembly may be utilized for constant rotation.

For constant rotational use, however, I prefer to utilize in lieu of the Teflon coating, a coating of poly-disulphide, which may be laid down at a temperature of 1,000° F. and thus will withstand higher temperatures than the coating of Teflon. Thus, for lower temperature operations, the Teflon coating will be satisfactory, but for higher temperature ranges, the poly-disulphide will be preferred.

In applying the layer of asbestos, a strip of the asbestos material, of a length to completely encircle the groove surface to be covered, is previously coated with the aforementioned lubricant or lubricants and then placed in the groove, where it is retained in position in preparation for the subsequent pouring operation, by one or more of split rings 55 of spring wire, which are snapped into position about the asbestos strip as thus installed.

With the asbestos strip thus retained, the body components of the swivel are assembled with the O-ring in position, and while held in the assembled position, the alloy is poured into the matching grooves through the opening provided therefor, and permitted to solidify to stabilize the assembly.

In the embodiment of the invention as illustrated in FIGURES 4 and 5, provision is made for greasing the swivel in lieu of relying on lubricant coatings entirely as in the previously described embodiments of the invention.

In this embodiment of the invention, the pouring opening for the molten alloy is a slot 59 of sufficient length to permit of the installation of an arcuate shield 61 of a width corresponding to that of the groove 31 to provide a snug fit thereof in the groove, with the ends of the shield preferably provided with a coating 62 of Teflon or the equivalent in a complementary fit with the floor of the groove. The arcuate shield as thus installed, defines a chamber or reservoir 63 for holding a supply of grease 65. Admission of grease to this storage chamber is by way of a grease fitting 67 installed in the crown of the arcuate shield.

Following the positioning of the arcuate shield and prior to the admission of grease thereto, the alloy is poured, and when solidified, will serve to retain the arcuate shield in place.

With the grease added, it will be apparent that relative rotational movement of the inner cylindrical portion of the swivel assembly with respect to the outer portion thereof, will serve to pick up lubricant from the grease reservoir and thus continue to lubricate the swivel. It will be apparent therefore that a swivel when so lubricated, may be maintained in continual rotation if desired.

In some applications, the Teflon or equivalent coatings may be eliminated from the embodiment of FIGURES 4 and 5.

The various embodiments of the invention as illustrated and described above have a great deal in common. The alloy filling provides a snug friction fit at all points and thus contributes greatly to the stability of the swivel and its otherwise inherent ability to sustain great moment stresses. The bearing surfaces of the swivel, further, are not exposed to flow through the swivel, and inasmuch as such flow may be practically anything in the field of liquids and gases, it becomes quite important that such bearing surfaces be not exposed thereto.

From the foregoing description of my invention, it will be apparent that the same fulfills all the objects attributed thereto, and while I have illustrated and described the same in considerable detail, it will be apparent that the same is subject to further alteration and modification without departing from the underlying principles involved, and I accordingly do not desire to be limited in my protection to the specific details illustrated and described, except as may be necessitated by the appended claims.

I claim:

1. A swivel coupling comprising an outer component having a passageway therethrough, an inner component rotatably fitting in said outer component and having a passageway therethrough connecting with said outer component passageway, and means between opposing walls of said outer and inner components for rotatably interlocking said outer and inner components, said interlocking means including aligned peripheral grooves in said opposing walls, a slot through the wall of said outer component in registry with said aligned grooves, a shield with its ends snugly fitting into the groove in the outer wall of said inner component and exposed through said slot, to form a chamber within said shield, means installed in said shield and accessible from without for introduction of a lubricant into said chamber, and cast material filling said grooves to the exclusion of said chamber, to both rotatably interlock said outer and inner components and anchor said shield.

2. A swivel coupling comprising an outer component having a passageway therethrough, an inner component rotatably fitting in said outer component and having a passageway therethrough connecting with said outer component passageway, and means between opposing walls of said outer and inner components for rotatably interlocking said outer and inner components, said interlocking means including aligned peripheral grooves in said opposing walls, a slot through the wall of said outer component in registry with said aligned grooves, a substantially arcuate shield with its ends snugly fitting into the groove in the outer wall of said inner component and exposed through said slot, to form a chamber within said shield, a grease fitting installed in said shield and extending through said slot to render the same accessible from without, and cast material filling said grooves to the exclusion of said chamber, to both rotatably interlock said outer and inner components and anchor said arcuate shield.

3. A swivel coupling comprising an outer component having a passageway therethrough, said outer component having a shoulder in said passageway, an inner component rotatably fitting in said outer component and having a passageway therethrough connecting with said outer component passageway, a sealing ring between said shoulder and the proximate end of said inner component, and means between opposing walls of said outer and inner components and protected by said sealing ring, for rotatably interlocking said outer and inner components, said protected interlocking means including aligned peripheral grooves in said opposing walls, a layer of refractory material covering the bottom and sides of the groove in the outer wall of said inner component, a slot through the wall of said outer component in registry with said aligned grooves, a substantially arcuate shield with its ends snugly fitting into and to substantially the bottom of the groove in the outer wall of said inner member in contact with said layer of refractory material and exposed through said slot, to form a chamber within said shield, a grease fitting installed in said arcuate shield and extending through said slot to render the same accessible from without, and cast material filling said grooves to the exclusion of said chamber, to both rotatably interlock said outer and inner components and anchor said arcuate shield.

References Cited by the Examiner

UNITED STATES PATENTS

| | | | |
|---|---|---|---|
| 170,473 | 11/1875 | Flagler et al. | 285—294 X |
| 360,993 | 4/1887 | Brown | 29—458 |
| 456,756 | 7/1891 | Bastian | 285—276 |
| 650,384 | 5/1900 | Feist | 184—1 |
| 1,076,962 | 10/1913 | Doble | 285—94 |
| 1,231,290 | 6/1917 | Otte | 29—458 |
| 2,003,864 | 6/1935 | Nock | 22—216.5 X |
| 2,330,197 | 9/1943 | Allen et al. | 285—94 X |
| 2,453,597 | 11/1948 | Sarver | 285—277 |
| 2,509,120 | 5/1950 | Warren | 285—276 X |
| 2,677,933 | 5/1954 | Hopkinson | 285—276 X |
| 2,686,155 | 8/1954 | Willis et al. | 184—1 |
| 2,749,151 | 6/1956 | Lyons | 285—276 |
| 2,786,698 | 3/1957 | Bard | 285—276 |
| 2,907,590 | 10/1959 | Oswald | 285—281 X |
| 2,948,033 | 8/1960 | Gulick | 22—202 |

OTHER REFERENCES

"Packing and Mechanical Seals," The Crane Packing Company, page 9.

THOMAS F. CALLAGHAN, *Primary Examiner.*